US006187476B1

(12) United States Patent
Pyun et al.

(10) Patent No.: US 6,187,476 B1
(45) Date of Patent: Feb. 13, 2001

(54) METHOD FOR MAKING ELECTRODE OF LITHIUM SECONDARY CELLS

(75) Inventors: Su Il Pyun; Yong Min Choe, both of Seoul (KR)

(73) Assignee: Korean Advanced Institute of Science and Technology Representative, Daejun (KR)

( * ) Notice: Under 35 U.S.C. 154(b), the term of this patent shall be extended for 0 days.

(21) Appl. No.: 09/006,754

(22) Filed: Jan. 14, 1998

(30) Foreign Application Priority Data

Jan. 15, 1997 (KR) .................................................. 97-1053

(51) Int. Cl.$^7$ ...................................................... H01M 4/58
(52) U.S. Cl. ................. 429/231.3; 429/217; 429/231.95; 423/594
(58) Field of Search ................................ 429/217, 231.3, 429/231.95; 423/594

(56) References Cited

U.S. PATENT DOCUMENTS

| | | | |
|---|---|---|---|
| 4,567,031 | * | 1/1986 | Riley ..................................... 423/593 |
| 5,478,675 | * | 12/1995 | Nagaura ................................ 429/224 |
| 5,630,993 | * | 5/1997 | Amatucci et al. .................... 423/594 |
| 5,686,138 | * | 11/1997 | Fujimoto et al. ..................... 429/197 |

FOREIGN PATENT DOCUMENTS

| | | | |
|---|---|---|---|
| 7-262994 | | 10/1995 | (JP) . |
| 8-222220 | * | 8/1996 | (JP) . |

* cited by examiner

*Primary Examiner*—Laura S Weiner
(74) *Attorney, Agent, or Firm*—Hickman Stephens Coleman & Hughes, LLP

(57) ABSTRACT

A method for making an electrode for lithium secondary cells. Lithium and cobalt ions are co-precipitated in an alkaline solution in such a way that the ratio of the former to the latter is 1.05:1 or more and then, are thermally treated to give $LiCoO_2$ powder. This ternary system compound is combined with a current collector and a binder. The electrode has an initial discharge capacity of 160 mAh/g and retains 90% of the initial capacity even after 400 times of charge/discharge cycle.

1 Claim, 7 Drawing Sheets

METHOD FOR MAKING ELECTRODE OF LITHIUM SECONDARY CELLS

CLAIM FOR FOREIGN PRIORITY

This application claims priority under 35 U.S.C. § 119 from Korean Patent Application No. 1053/1997 filed on Jan. 15, 1997, which is incorporated herein by reference for all purposes.

BACKGROUND OF THE INVENTION

1. Field of the Invention

The present invention relates, in general, to a method for making an electrode of a secondary lithium cells and, more particularly, to a method for making a cathode of a secondary lithium cell by co-precipitating lithium and cobalt ions at a predetermined ion ratio in an alkaline solution.

2. Description of the Prior Art

A lithium secondary cell typically comprises a lithium metal or carbon for anode, a chalcogenide compound or transition metal oxide for cathode, and an organic solvent for electrolyte. The material for the cathode should exhibit chemical stability to the electrolyte, charge/discharge reversibility and high energy density. In particular, a lithium ion cell which employs carbon as an anode requires a cathode material high in unit cell voltage. For this, transition metal oxides are selected, including $LiCoO_2$, $LiNiO_2$, $LiNi_{1-y}Co_yO_2$ and $LiMn_2O_4$. Depending on the kind of materials, such as lithium and transition metal salts, and on the thermal conditions therefor, the oxides could greatly affect the properties of the cell, such as, for example, discharge capacity and cycle life span.

Most of the methods known to those skilled in the art are of solid state reaction in which the lithium salts and the transition metal salts are thermally treated at a temperature of 400–1000° C. (Japanese Pat. Laid-Open Publication No. Heisei 7-262994). The powder obtained by the solid state reaction, however, requires a temperature too high for thermal treatment and too much time for calcination in addition to being inhomogeneous in size and irregular in morphology.

In order to exhibit superior electrode properties even at high current density, the powder used as a material for lithium secondary cells should be homogeneous in size and regular in morphology. To use $LiCoO_2$ as an electrode material for lithium secondary cells, it is made into a powder. There has been developed no method, except for a solid state reaction technique, to make $LiCoO_2$ electrodes exhibiting excellent properties, thus far.

SUMMARY OF THE INVENTION

Intensive and thorough research repeated by the present inventors aiming to take advantage of solution methods in current use in other fields for the purpose of making transition metal oxide, resulted in finding that a co-precipitation method is suitable for making an $LiCoO_2$ electrode for secondary cells.

Therefore, it is an object of the present invention to overcome the above Problems encountered in prior arts and to provide a method for making an electrode for lithium secondary cells superior in initial discharge capacity and charge/discharge life span.

In accordance with the present invention, the above object could be accomplished by a provision of a method for making an electrode for lithium secondary cells, comprising the steps of: co-precipitating lithium ions and cobalt ions in an alkaline solution, the ratio of said lithium ions to said cobalt ions being at least 1.05:1; subjecting the co-precipitate to calcination and thermal treatment to give $LiCoO_2$ powder; and mixing the powder with a current collector and a binder.

BRIEF DESCRIPTION OF THE DRAWINGS

Other objects and aspects of the invention will become apparent from the following description of embodiments with reference to the accompanying drawings in which.

DETAILED DESCRIPTION OF THE INVENTION 1 mole of lithium hydroxide (LiOH) and 3 moles of ammonium hydroxide ($NH_4OH$) are mixed with a methanol solution containing $Co(OH)_2$ and ethylene glycol in such a way that the ratio of Li ion to Co ion be 1.05:1 or more. The resulting mixture is dried at 50° C. in vacuo to give precipitates. Subsequently, they are calcined at 120° C. for 2 hours and then, subjected to thermal treatment at 500–950° C. for 6–24 hours, to produce $LiCoO_2$ powder. In combination with a current collector and a binder, the ternary system powder is used to make an electrode for lithium secondary cells. Because the lithium salt evaporates faster than the cobalt salt upon the thermal treatment, the ratio of the former to the latter, as mentioned above, should be at least 1.05 in order to compensate for the loss of the lithium salt.

Figure 1:
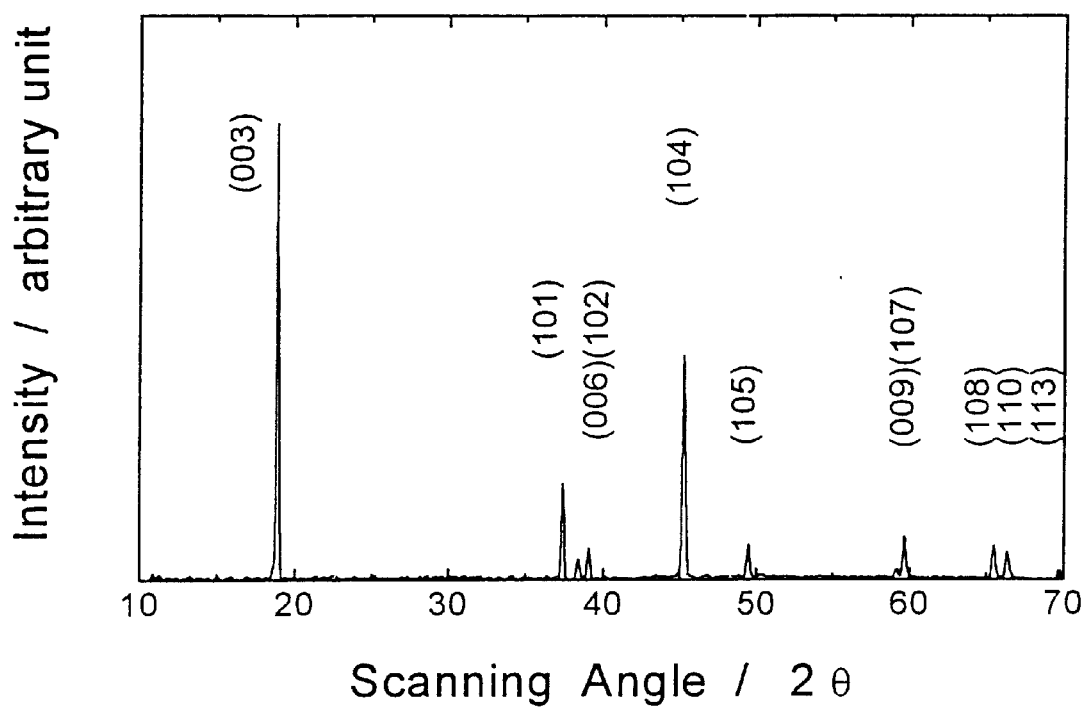
FIG. 1 shows X-ray diffraction patterns of the $LiCoO_2$ powder of the invention.

Referring to FIG. 1, there are X-ray diffraction patterns of the $LiCoO_2$ powder. $LiCoO_2$ has a crystalline structure of a space group R 3 m in which Li, Co and O atoms are positioned at Wyckoff positions 3b, 3a and 3c, respectively. In the figure, peaks which are smaller in 2θ value appear from the left. When applying the patterns each to a hexagonal crystal system, the peaks correspond to the crystal surfaces (003), (101), (006), (103), (104), (105), (108), (110), and (113), as shown in the figure. It was confirmed that these results were well consistent with the positions on the standard X-ray diffraction patterns of JCPDS card with respect to each of the powders.

$LiCoO_2$ has an oxygen-containing close packing crystalline structure slightly deviated from an ideal cubic-close packing structure. In such structure, the transition metal ions, such as Co, are surrounded by 6 oxygen ions, producing $CoO_2$ layers. Lithium ions are present between the layers, allowing structure of a hexagonal crystal system. Assuming that a hexagonal crystal system is formed, the lattice constants thereof are: a=2.815 Å, c=14.054 Å.

For $LiCoO_2$, the Co ions present in the lithium ion layers impede the electrochemical reactivity of the electrode, especially the diffusion of the lithium ions, deleteriously affecting the properties of electrode. The arrangement change of the atom layers within this crystal structure has an influence on the intensity ratio of the X-ray diffraction patterns, such as I(003)/I(104) and I(006,102)/I(101). The larger the integrated intensity ratio of peak (003) to peak (104), I(003)/I(104), and the sharper the distinction between peak (108) and peak (110) or between peak (006) and peak (102), the less the cobalt ions are present in the lithium ion layers and, thus, the more excellent the properties of electrode become. When the ratio is below 1.2, the reversible capacity of the cell is greatly reduced and it is impossible to discriminate between peak (108) and peak (110) or between peak (006) and peak (102). This phenomenon, called cation mixing, has a deleterious influence on the charge/discharge capacity of the electrode as well as the life span thereof. The $LiCoO_2$ of the present invention is expected to be superior in electrode properties since the ratio I(003)/I(104) is 1.39 and there is clear distinction between peak (108) and peak (110) and between peak (006) and peak (102).

Figure 2:
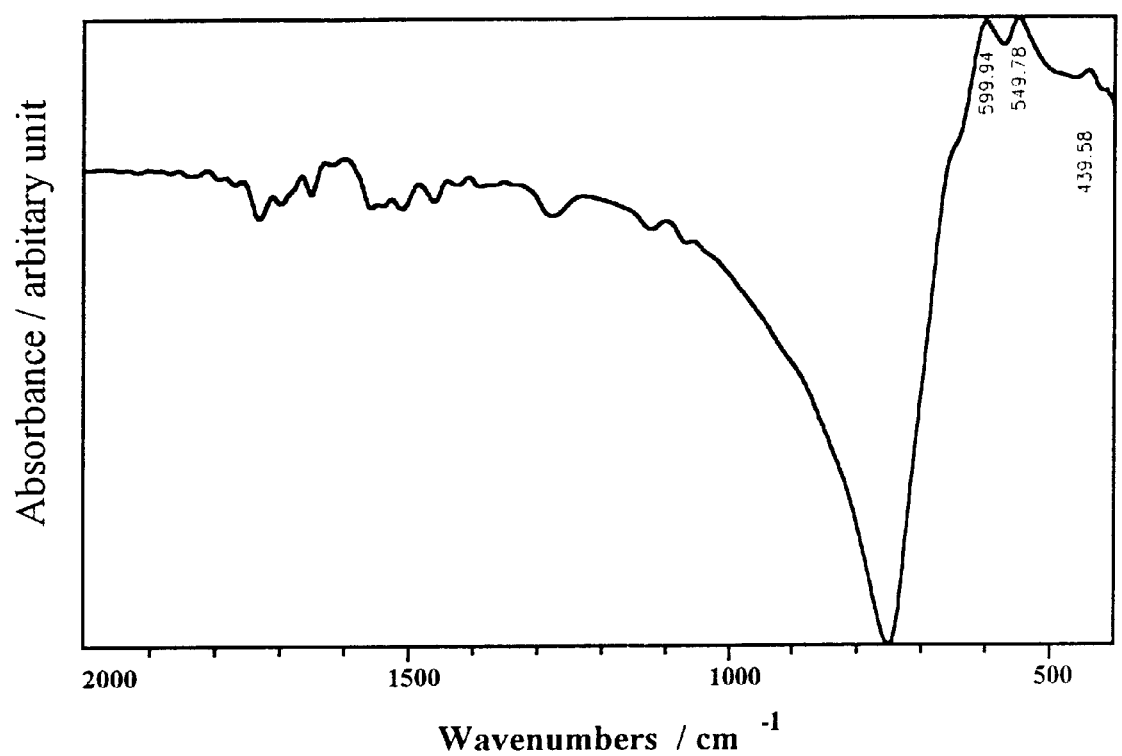
FIG. 2 is a FTIR (Fourier Transform Infra-Red) absorption curve of the $LiCoO_2$ powder.

Referring to FIG. 2, there is a Fourier Transformation Infra-red absorption curve with respect to the $LiCoO_2$ powder of the present invention. The peaks read between 400 and 600 cm$^{-1}$ are owing to the binding of $Co^{3+}$ ions to the oxygen ions.

Figure 3:
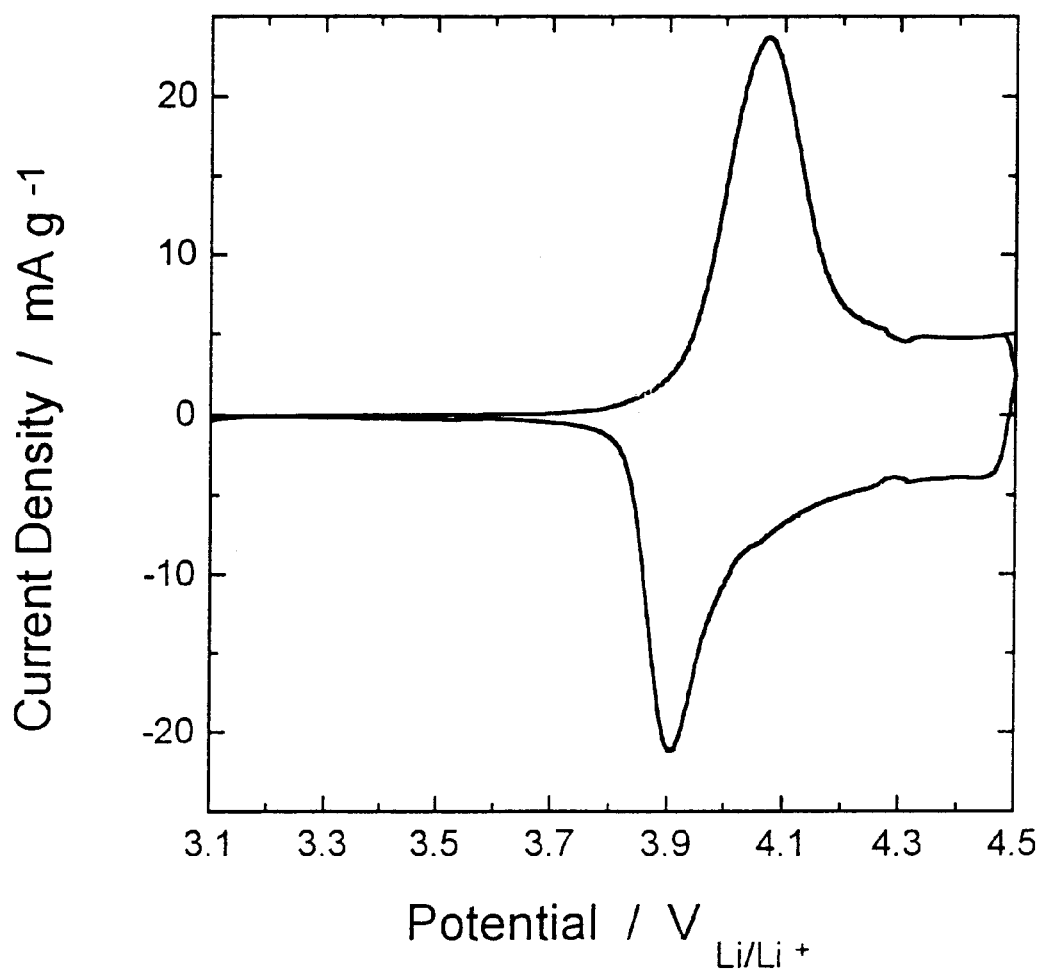
FIG. 3 is the first cyclic voltamogram of an electrode made of the $LiCoO_2$ powder, carbon black and polyvinylidene fluoride.

Referring to FIG. 3, there is a cyclic voltamogram of the $LiCoO_2$, which is obtained at a scanning rate of 0.01 mV/s in a $V_{Li/Li+}$ range from 3.1 to 4.5. As seen in this voltamogram, large reduction and oxidation peaks are read at 3.90 $V_{Li/Li+}$ and 4.05 $V_{Li/Li+}$, respectively. These appear as lithium ions are intercalated into and deintercalated from their own positions within the oxide structure, respectively. The small peaks read at potentials of 4.28 $V_{Li/Li+}$ and 4.31 $V_{Li/Li+}$ are attributed to the order-disorder transition occurring at a lithium composition ranging from 0.45 to 0.5 within the electrode. The peaks attributable to such isothermal order-disorder phase transformation became larger in size and wider ($\Delta V$) as temperature is lowered from 25° C. to 10° C. This is a typical phenomenon which occurs upon order-disorder phase transformation within an oxide structure.

Figure 4:
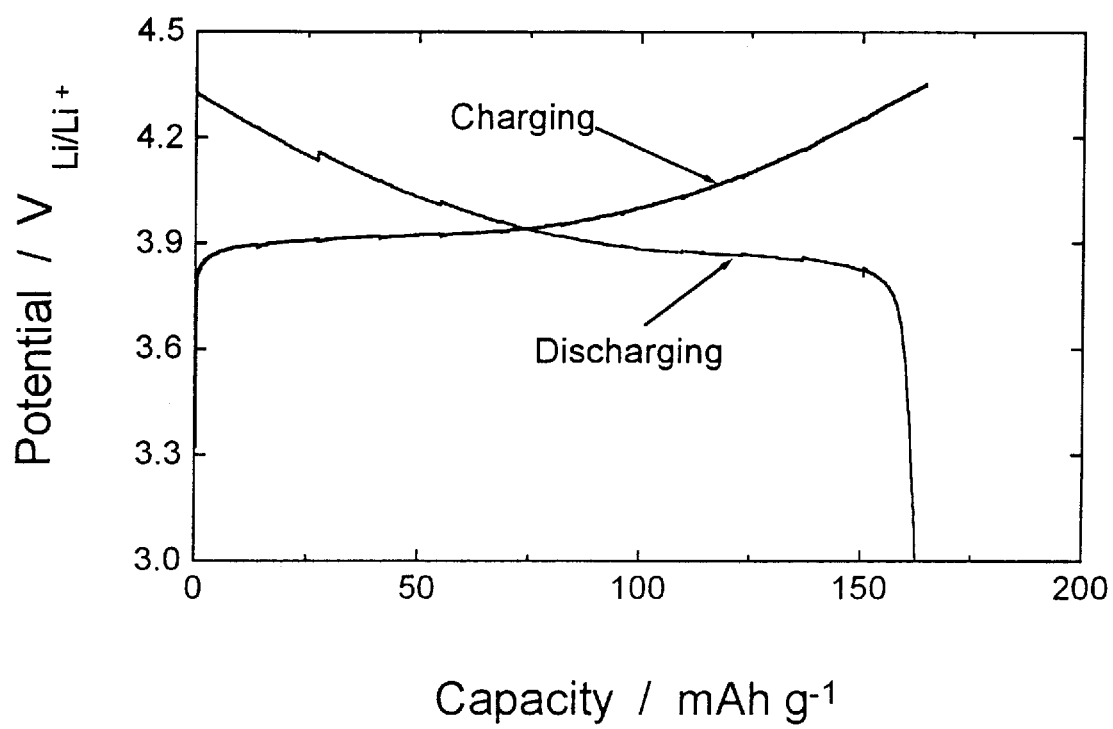
FIG. 4 is a plot showing a potential change with electrode capacity during the first charge/discharge cycle of the electrode made of the $LiCoO_2$ powder, carbon black and polyvinylidene fluoride.

With reference to FIG. 4, there is a plot showing the potential change with the capacity of the $LiCoO_2$ electrode upon the first cycle of charge/discharge at a constant current. In the charge/discharge curve, the wide potential plateau region having a potential of about 3.95 $V_{Li/Li+}$ results from the equilibrium between two pseudo-phases, that is, an a phase low in lithium content and a B phase high in lithium content. The area of the region determines the capacity of the electrode and it was measured to be 166.1 mAh/g for charge and 164.4 mAh/g for discharge in the first cycle, which are high in utility, e.g. 60.6% and 60.0% of the theoretical capacity of $LiCoO_2$ electrode, respectively.

Figure 5:
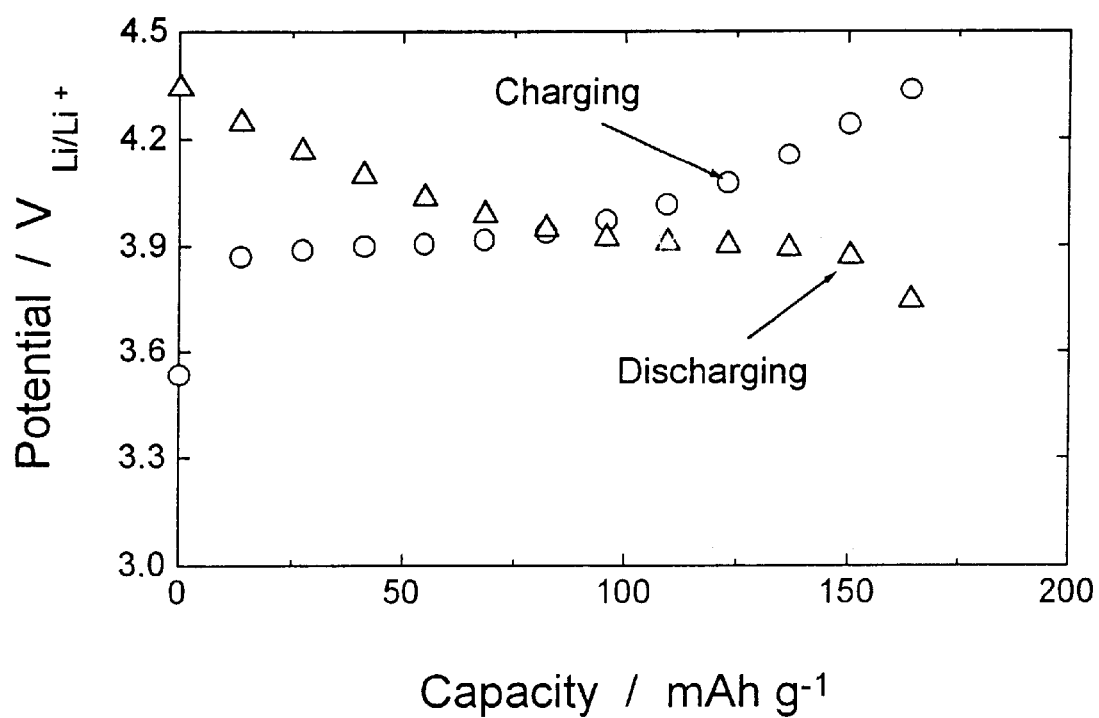
FIG. 5 is a plot showing an electrode potential change with electrode capacity during the first charge/discharge cycle of the $LiCoO_2$ electrode.

Referring to FIG. 5, electrode potentials change with the capacity of the $LiCoO_2$ electrode during its first charge/discharge cycle. Each of the electrode potentials plotted is one of equilibrium measured when current modulates within $10^{-8}$ A or less after an open-circuit has been made in the first charge/discharge cycle. The difference in the electrode potentials upon charge and discharge is very small, which demonstrates that the reversibility of electrode reaction can be kept very excellent even though charge/discharge cycles proceed. In addition, the small difference between the charge/discharge potential of FIG. 3 and the electrode potential of FIG. 4 means that the resistance to the electrode reaction is very small.

Figure 6:
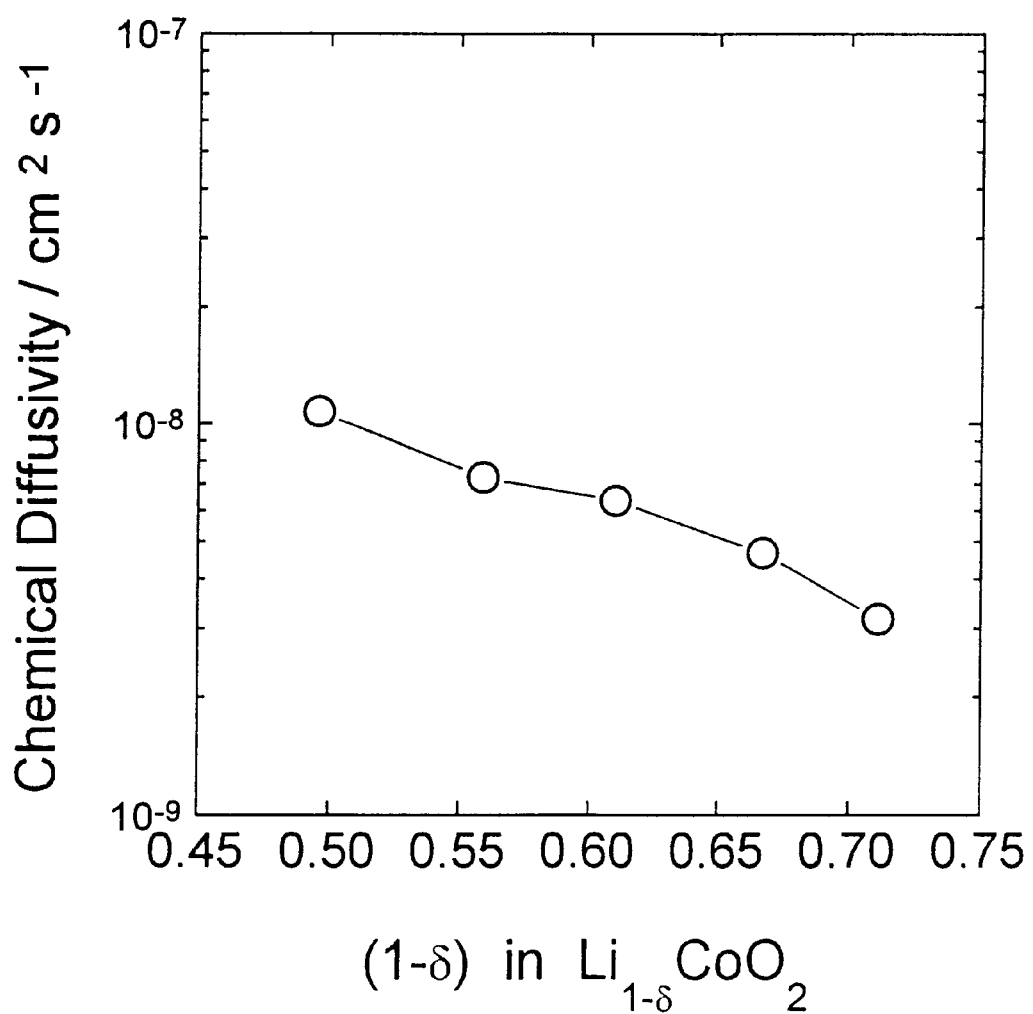
FIG. 6 shows the relation between the diffusion coefficient of the lithium ions and the lithium content in the $LiCoO_2$ electrode as obtained by an electrochemical impedance measurement technique.

Turning now to FIG. 6, there are plotted the diffusion coefficients of the lithium ions within the $LiCoO_2$ electrode with regard to the lithium composition, as measured by an electrochemical impedance technique. In the electrode, the diffusion coefficient of the lithium ions ranges from about $10^{-8}$ to $10^{-9}$ cm$^{-2}$s$^{-1}$. As the lithium content increases, the driving force for diffusion decreases so that the diffusion coefficient has a tendency to decrease a little.

Figure 7:
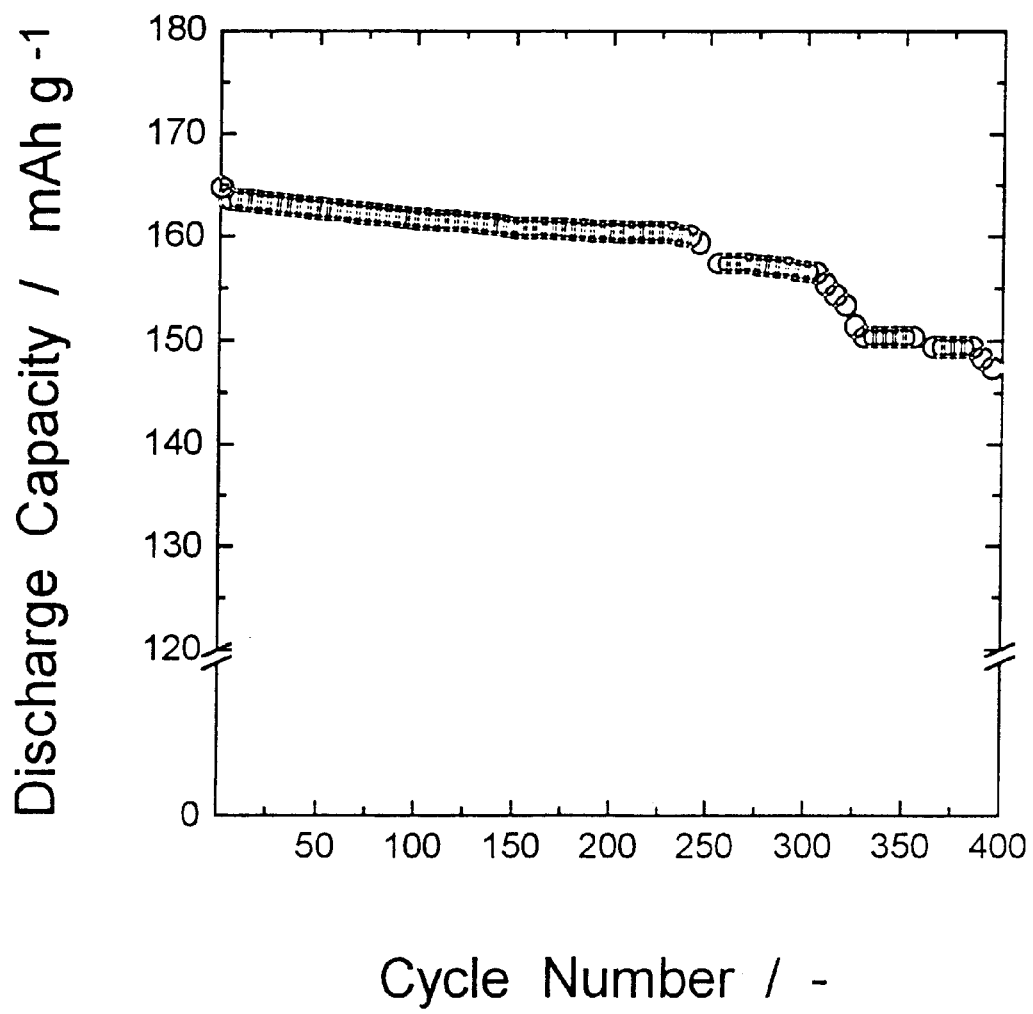
FIG. 7 shows a change in the discharge capacity of the $LiCoO_2$ electrode with the number of charge/discharge cycle.

With reference to FIG. 7, there is shown the capacity change of the $LiCoO_2$ electrode with the number of the charge/discharge cycle thereof. The discharge capacity was measured to be 164.4 mAh/g at first and about 148 mAh/g after 400 charge/discharge cycles, which is 90% of the initial capacity. Therefore, the electrode of the present invention is far superior in charge/discharge properties.

A better understanding of the present invention may be obtained through the following examples which are set forth to illustrate, but are not to be construed as the limit of the present invention.

EXAMPLE I 1 mole of lithium hydroxide (LiOH) and 3 moles of ammonium hydroxide ($NH_4OH$) were mixed with a methanol solution containing $Co(OH)_2$ and ethylene glycol in such a way that the ratio of Li ion to Co ion was 1.05:1 or more. The resulting mixture was dried at 50° C. in vacuo to give precipitates. Subsequently, they were calcined at 120° C. for 2 hours and then, thermally treated at 500° C. for 6 hours, to produce $LiCoO_2$ powder.

EXAMPLE II 1 mole of lithium hydroxide (LiOH) and 3 moles of ammonium hydroxide ($NH_4OH$) were mixed with a methanol solution containing $Co(OH)_2$ and ethylene glycol in such a way that the ratio of Li ion to Co ion was 1.07:1 or more. The resulting mixture was dried at 50° C. in vacuo to give precipitates. Subsequently, they were calcined at 120° C. for 2 hours and then, thermally treated at 750° C. for 12 hours, to produce $LiCoO_2$ powder.

EXAMPLE III 1 mole of lithium hydroxide (LiOH) and 3 moles of ammonium hydroxide ($NH_4OH$) were mixed with a methanol solution containing $Co(OH)_2$ and ethylene glycol in such a way that the ratio of Li ion to Co ion was 1.10:1 or more. The resulting mixture was dried at 50° C. in vacuo to give precipitates. Subsequently, they were calcined at 120° C. for 2 hours and then, thermally treated at 950° C. for 24 hours, to produce $LiCoO_2$ powder.

EXAMPLE IV

A poly-vinylidene fluoride solution in N-methyl pyrrolidone was used as a binder and carbon black (Vulcan XC-72$^R$, surface area 250 m$^2$/g) as a current collector. The $LiCoO_2$ powder obtained in Example I was mixed with 3 weight % of the binder and 5 weight % of the current collector to make paste. It was coated and dried for 1 hour to give an electrode for lithium secondary cells.

TEST EXAMPLE I

X-Ray Diffraction Patterns of $LiCoO_2$ Powder

Using Cu-K$\alpha$ radiation at a scanning rate of 4°/min in a range of 10°<2$\theta$<70°, the x-ray diffraction patterns of the LiCoO$_2$ powder obtained in Example I were determined and the results are shown in FIG. 1.

TEST EXAMPLE II

Change in Cyclic Voltametry of Electrode

A cyclic voltamogram of the LiCoO$_2$ electrode obtained in Example IV was determined using a scanning rate of 0.01 mV/sec in a range of 3.1 to 4.5 V$_{Li/Li+}$ and the result is shown in FIG. 3. As an electrolyte, 1M lithium hexafluorophosphate (LiPF$_6$) solution in ethylene carbonate (EC)-diethyl carbonate (DEC) was used. For a reference electrode and a counter electrode both, lithium metal with a purity of 99.99% was used.

TEST EXAMPLE III

Potential and Equilibrium Potential Change of Electrode at First Charge/Discharge Cycle While an Li/1M LiPF$_6$(EC-DEC)/LiCoO$_2$ cell was applied with a current and shortened repeatedly for 10 hours, changes in potential and equilibrium electrode potential with time was determined and the results are given as shown in FIGS. 4 and 5. The equilibrium electrode potential was measured when current modulated within 10$^{-8}$ A or less after a current supply was ceased and an open circuit was maintained for 3,000 sec.

TEST EXAMPLE VI

Diffusion Coefficient of Lithium Ions in the Electrode

During a test of an Li/1M LiPF$_6$(EC-DEC)/LiCoO$_2$ cell for charge/discharge, a current pulse was applied to the cell. When the potential of the electrode reached an equilibrium state, an impedance was measured under a constant current condition. From this, the diffusion coefficients of the lithium ions in the LiCoO$_2$ electrode were determined according to the lithium content in the electrode. The result is shown in FIG. 6. Upon the measurement of impedance, the test frequency was in a range of 1 mHz to 100 kHz with a voltage amplitude of 5–10 mV$_{rms}$.

TEST EXAMPLE V

Change in Electrode Capacity with Charge/Discharge Cycle

An Li/1M LiPF$_6$(EC-DEC)/LiCoO$_2$ cell was 400 times tested for charge/discharge at a constant current condition of C/2 and the result is shown in FIG. 7.

Superior to conventional electrodes for lithium secondary cells in discharge capacity and charge/discharge life span, the electrode of the present invention, as described hereinbefore, was found to have an initial discharge capacity of 160 mAh/g and retain 90% or more of the initial capacity even after 400 times of charge/discharge cycle.

The present invention has been described in an illustrative manner, and it is to be understood the terminology used is intended to be in the nature of description rather than of limitation.

Many modifications and variations of the present invention are possible in light of the above teachings. Therefore, it is to be understood that within the scope of the appended claims, the invention may be practiced otherwise than as specifically described.

What is claimed is:

1. A method for making an electrode for lithium secondary cells, comprising the steps of:

co-precipitating lithium ions and cobalt ions in a methanol solution including 1M LiOH, 3M NH$_4$OH, Co(OH)$_2$ and ethylene glycol, the ratio of said lithium ions to said cobalt ions being at least 1.05:1;

subjecting the co-precipitate to calcination and thermal treatment to give LiCoO$_2$ powder; and mixing the powder with a current collector and a binder.

* * * * *

UNITED STATES PATENT AND TRADEMARK OFFICE
CERTIFICATE OF CORRECTION

PATENT NO.   : 6,187,476 B1
DATED        : February 13, 2001
INVENTOR(S)  : Su Il Pyun It is certified that error appears in the above-identified patent and that said Letters Patent is hereby corrected as shown below:

<u>Title page,</u>
Item [75], Inventors, reads:
"Su Il Pyun; Yong Min Choe, both of Seoul (KR)"
It should read:
-- Su Il Pyun, Seoul (KR) --;

Signed and Sealed this

Twenty-fourth Day of December, 2002

JAMES E. ROGAN
*Director of the United States Patent and Trademark Office*